(12) United States Patent
Kitaya et al.

(10) Patent No.: US 10,068,152 B2
(45) Date of Patent: Sep. 4, 2018

(54) IMAGE CAPTURE APPARATUS, METHOD OF CONTROLLING IMAGE CAPTURE APPARATUS, AND NON-TRANSITORY COMPUTER-READABLE STORAGE MEDIUM

(71) Applicant: CANON KABUSHIKI KAISHA, Tokyo (JP)

(72) Inventors: Koki Kitaya, Kawasaki (JP); Katsuhito Yoshio, Tokyo (JP); Takeshi Kikkawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 15/288,144

(22) Filed: Oct. 7, 2016

(65) Prior Publication Data

US 2017/0104900 A1 Apr. 13, 2017

(30) Foreign Application Priority Data

Oct. 9, 2015 (JP) ................. 2015-201541

(51) Int. Cl.
*H04N 5/222* (2006.01)
*G06K 9/52* (2006.01)
*G06T 7/60* (2017.01)
*H04N 5/232* (2006.01)
*G06K 9/62* (2006.01)
(Continued)

(52) U.S. Cl.
CPC ............ *G06K 9/52* (2013.01); *G06K 9/6215* (2013.01); *G06T 7/11* (2017.01); *G06T 7/13* (2017.01); *G06T 7/60* (2013.01); *H04N 5/23293* (2013.01); *G06K 2009/4666* (2013.01); *G06T 2207/20112* (2013.01)

(58) Field of Classification Search
CPC ........... H04N 5/23293; H04N 1/00411; H04N 1/00408; H04N 1/00458; G03B 13/00; G03B 13/02; G03B 13/04
USPC ....................................... 348/333.01–333.12
See application file for complete search history.

(56) References Cited

U.S. PATENT DOCUMENTS 8,035,720 B2* 10/2011 Ozone .................... H04N 5/232
345/619
8,625,020 B2* 1/2014 Cheong ............. H04M 1/72522
348/333.02

(Continued)

FOREIGN PATENT DOCUMENTS

JP 2007-208854 A 8/2007
JP 2012-080428 A 4/2012

*Primary Examiner* — Kelly L Jerabek
(74) *Attorney, Agent, or Firm* — Carter, DeLuca, Farrell & Schmidt, LLP

(57) ABSTRACT

An image capture apparatus, comprising, an image capture unit, an attitude detection unit configured to detect an attitude of the image capture apparatus, and a display control unit configured to perform control so as to display an image that was captured by the image capture unit in, among a first area along a first edge in a display unit visible through an eyepiece unit of an eyepiece finder, and a second area differing from the first area and along a second edge opposing the first edge in the display unit, the first area regardless of the attitude detected by the attitude detection unit, and so as to display an information group related to shooting in the display unit with an arrangement that differs according to the attitude detected by the attitude detection unit.

12 Claims, 11 Drawing Sheets

(51) Int. Cl.
     *G06T 7/11*    (2017.01)
     *G06T 7/13*    (2017.01)
     *G06K 9/46*    (2006.01)

(56) References Cited

U.S. PATENT DOCUMENTS

| | | | | |
|---|---|---|---|---|
| 2008/0036876 | A1* | 2/2008 | Kaneda | G06F 1/1626 |
| | | | | 348/230.1 |
| 2010/0149398 | A1* | 6/2010 | Gayer | G03B 17/20 |
| | | | | 348/333.01 |
| 2012/0176508 | A1* | 7/2012 | Jeong | H04N 5/2251 |
| | | | | 348/231.2 |
| 2014/0176775 | A1* | 6/2014 | Ichikawa | H04N 5/23293 |
| | | | | 348/333.05 |
| 2016/0105619 | A1* | 4/2016 | Lee | H04N 5/232 |
| | | | | 348/333.01 |
| 2016/0198093 | A1* | 7/2016 | Ito | H04N 5/23245 |
| | | | | 348/333.02 |

* cited by examiner

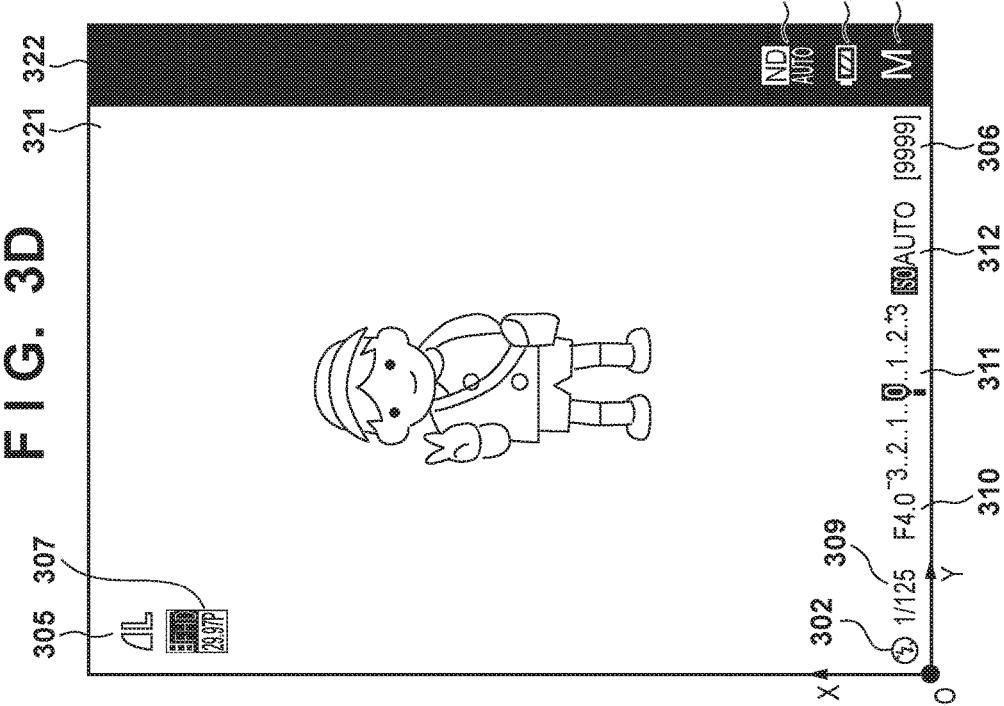
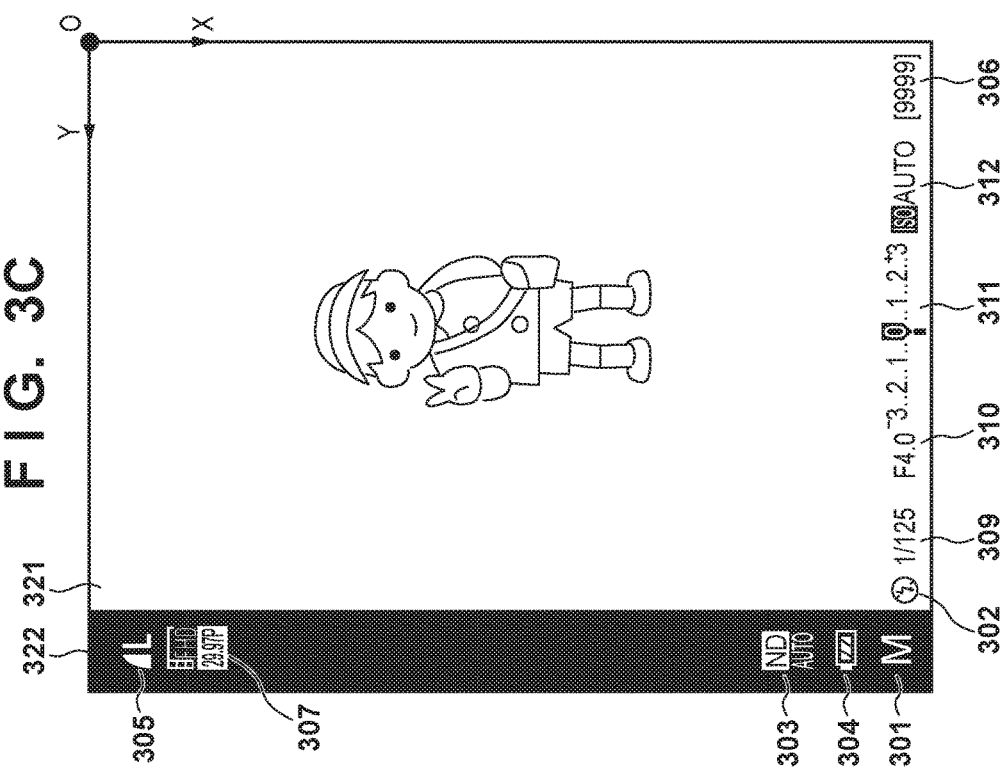

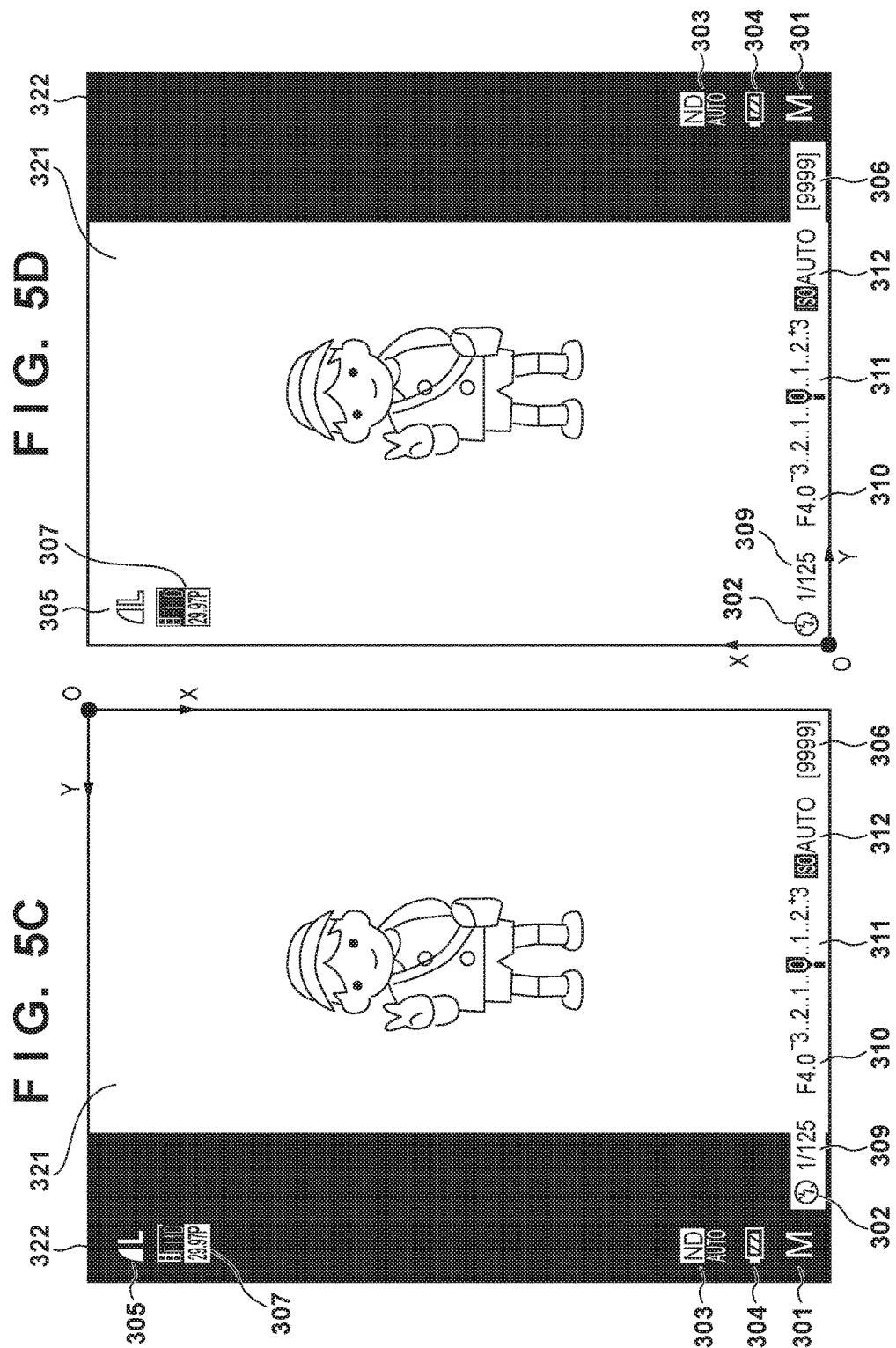

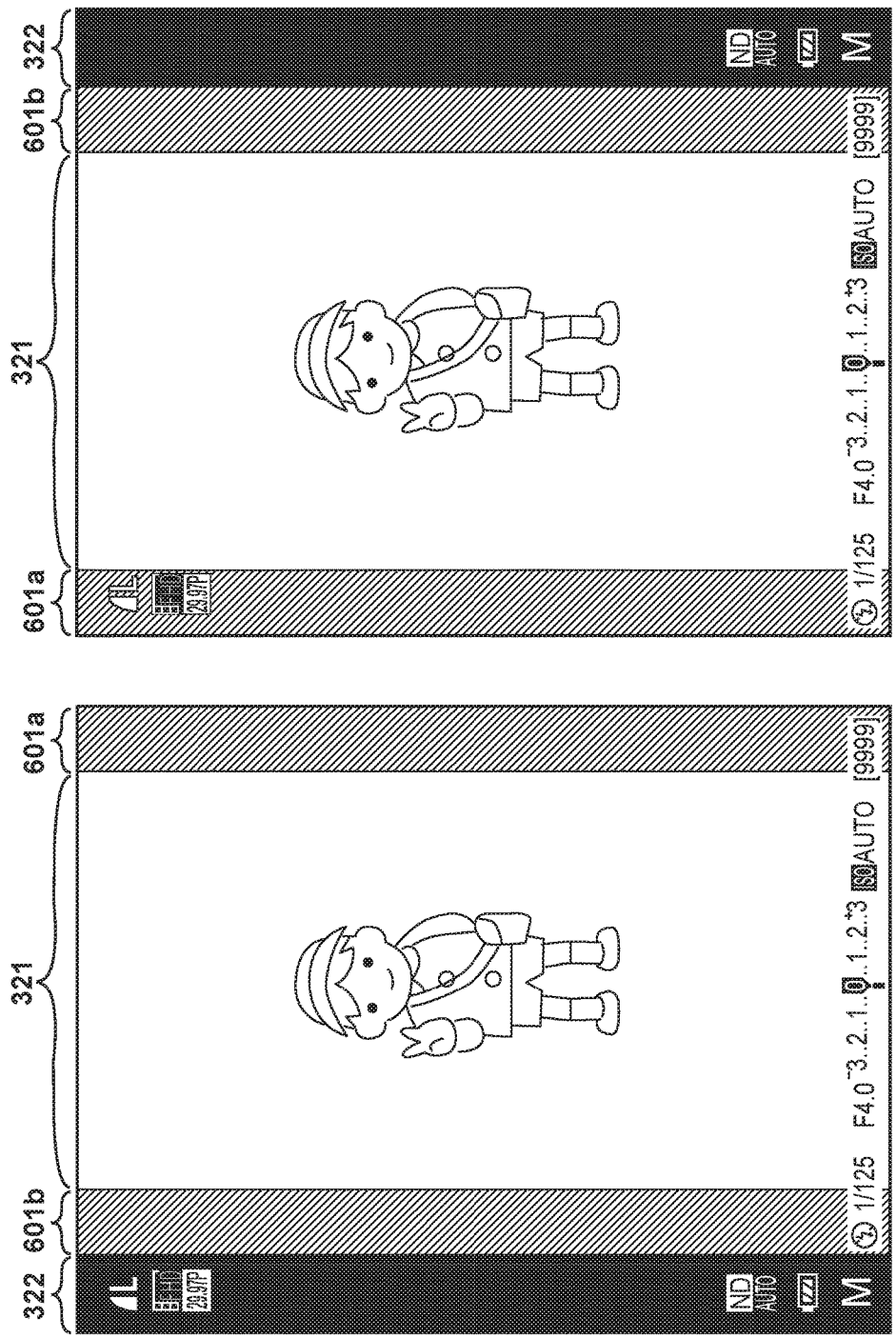

IMAGE CAPTURE APPARATUS, METHOD OF CONTROLLING IMAGE CAPTURE APPARATUS, AND NON-TRANSITORY COMPUTER-READABLE STORAGE MEDIUM

BACKGROUND OF THE INVENTION

Field of the Invention

The present invention relates to an image capture apparatus, a method of controlling the image capture apparatus, and a non-transitory computer-readable storage medium.

Description of the Related Art

Conventionally, an optical finder has been used in a camera. However, with the introduction of digital cameras, an apparatus such as a liquid crystal monitor or the like came to be installed in a monitor display apparatus. Also, a digital camera has been proposed in which display information displayed in a monitor is changed according to attitude of the camera (see Japanese Patent Laid-Open No. 2007-208854).

Also, a method is known in which, in a case where the aspect ratio of a captured image differs from the aspect ratio of a display unit that displays the image, the image is displayed with a strip-like area (so-called 'side-black' or letterbox) where the image is not displayed provided on both sides of the image (see Japanese Patent Laid-Open No. 2012-80428). Also, as the responsiveness of display has improved, an electronic viewfinder has come to be installed instead of an optical finder in a finder display unit as well.

Visibility of a subject is better when information display of an icon or the like is performed while avoiding superimposing this display on a shot image as much as possible, so this is suitable. Consequently, in a case where a strip-like area of a side-black or letterbox display is displayed, it is conceivable to display information within the strip-like area, without superimposing information on the shot image. However, when the strip-like area is small, there is a possibility that icons will not neatly fit, and a protruding portion becomes superimposed on a live-view image. Consequently, in order to secure a larger space for the strip-like area, it is conceivable to display the strip-like area gathered at one side of a captured image, rather than on both sides of the image.

However in this case, when, as in Japanese Patent Laid-Open No. 2007-208854, attempting to use the same layout from the perspective of the user even when the image is rotated, in the case of a vertical position tilted 90 degrees and a vertical position tilted 270 degrees (with top and bottom reversed relative to the vertical position tilted 90 degrees), it is necessary to exchange the positions where the live-view image and the strip-like area are rendered. For example, when the camera is put in a vertical position rotated 90 degrees, the strip-like area attempts to be gathered on the right side from the perspective of the user, and when the camera is put in a vertical position rotated 270 degrees as well, the strip-like area attempts to be gathered on the right side from the perspective of the user. In this case, it is necessary for the strip-like area that was gathered at the top of the display unit in the case of a 90 degree vertical position to be gathered at the bottom side of the display unit in response to the 270 degree rotation. When doing so, the position where the shot image is rendered is changed from a position gathered at the bottom side of the display unit to a position gathered at the top side of the display unit. With this configuration, also in a case where the user has rotated the camera while continuing to view the same subject in a live-view image being displayed in the display unit, the display position of the image moves in the midst of this operation, so the position of the subject that was being viewed shifts and therefore continuity is impaired. Therefore, work to decide composition while viewing the live-view image becomes difficult.

SUMMARY OF THE INVENTION

The present invention provides an image capture apparatus capable of displaying information with good visibility while maintaining continuity of a display position of a live-view image, and a method of controlling the image capture apparatus.

One aspect of embodiments relates to an image capture apparatus, comprising, an image capture unit, an attitude detection unit configured to detect an attitude of the image capture apparatus, and a display control unit configured to perform control so as to display an image that was captured by the image capture unit in, among a first area along a first edge in a display unit visible through an eyepiece unit of an eyepiece finder, and a second area differing from the first area and along a second edge opposing the first edge in the display unit, the first area regardless of the attitude detected by the attitude detection unit, and so as to display an information group related to shooting in the display unit with an arrangement that differs according to the attitude detected by the attitude detection unit.

Further features of the present invention will become apparent from the following description of exemplary embodiments (with reference to the attached drawings).

BRIEF DESCRIPTION OF THE DRAWINGS

FIGS. 3A to 3D show exemplary displays of image capture information and live-view view images corresponding to an embodiment of the invention.

FIGS. 5A to 5D show exemplary displays of image capture information and live-view view images corresponding to an embodiment of the invention.

FIGS. 6A to 6D show exemplary displays of image capture information and live-view view images corresponding to an embodiment of the invention.

DESCRIPTION OF THE EMBODIMENTS

Following is a description of embodiments of the invention with reference to the accompanying drawings. Note that in the following description of embodiments of the invention, by way of example, technical concepts of the present invention are applied to an image capture apparatus serving as a digital camera capable of shooting still images and movies.

Configuration of Digital Camera

Figure 1A:
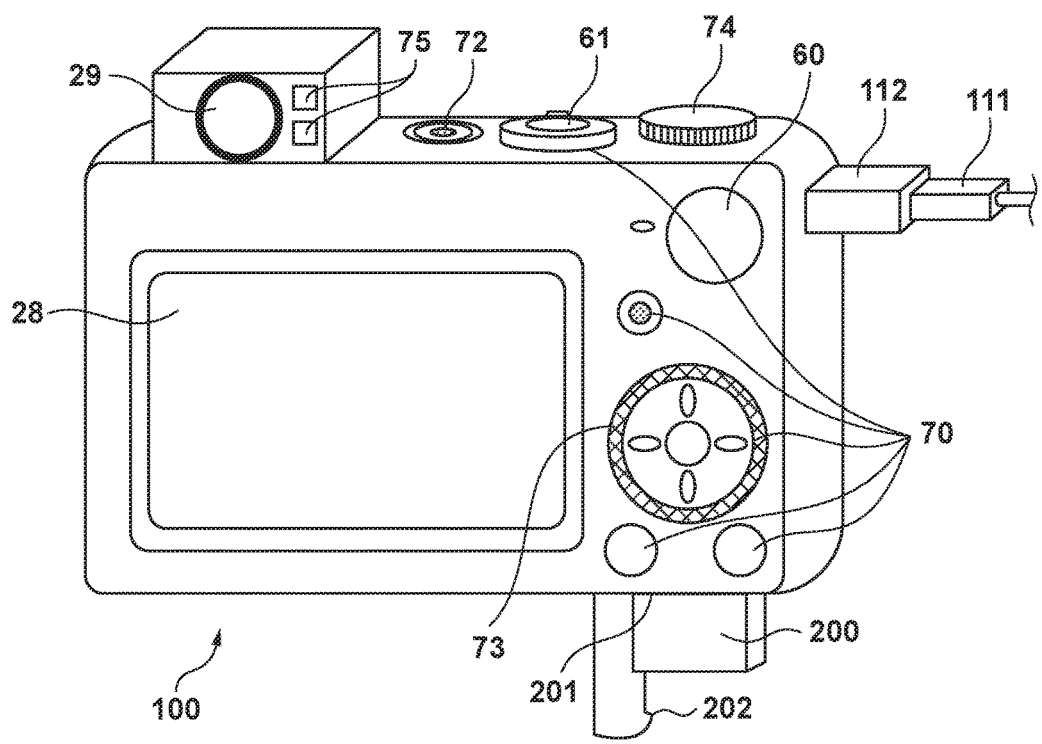
FIG. 1A is a block diagram showing an exemplary back face external view of a digital camera serving as one example of an image capture apparatus corresponding to an embodiment of the invention.

FIG. 1A shows a back face external view of a digital camera 100 serving as one example of an image capture apparatus corresponding to an embodiment of the invention. A display unit 28 is visible from outside of the digital camera 100, and is a display unit configured to display images and various information. A finder display unit 29 is an eyepiece finder (a so-called electronic finder) disposed within a display apparatus that is visible through an eyepiece unit, and is configured to display images and various information. A sensor 75 is a proximity sensor for detecting eye contact to the eyepiece unit of the finder display unit 29. In the present embodiment, the finder display unit 29 is provided in the digital camera 100. However, a configuration may also be adopted in which, even if not provided in the digital camera 100, a removable-type electronic finder apparatus can be installed in an accessory installation unit, or a configuration may be adopted in which a video image can be output from the digital camera 100 to a removable-type electronic finder apparatus. In the present embodiment, the aspect ratio of the display area of the display unit 28 is 3 horizontal:2 vertical, and the aspect ratio of the display area of the display apparatus of the finder display unit 29 is 4 horizontal:3 vertical. That is, the display area of the display unit 28 is wider than the display area of the finder display unit 29. A shutter button 61 is an operation unit configured to receive a shooting instruction from a user. A mode switching switch 60 is an operation unit for receiving switching of various modes from the user. A connector 112 is a connector configured to connect the digital camera 100 to a connection cable 111.

An operation unit 70 is an operation unit including operation members such as various switches, buttons, touch panels, or the like that receive various operations from the user. A wheel 73 is an operation member capable of rotational operation, and is included in the operation unit 70. A power switch 72 is a push-button configured to switch between power on and power off. An electronic dial 74 is a rotating operation member having a feeling of operation, and is capable of changing settings of various functions that have been assigned. A recording medium 200 is a recording medium such as a memory card or a hard disk, for example, and is configured to be removable from the digital camera 100. A recording medium slot 201 is a slot for storing the recording medium 200. When stored in the recording medium slot 201, the recording medium 200 is capable of communicating with the digital camera 100. A cover 202 is a cover of the recording medium slot 201.

Figure 1B:
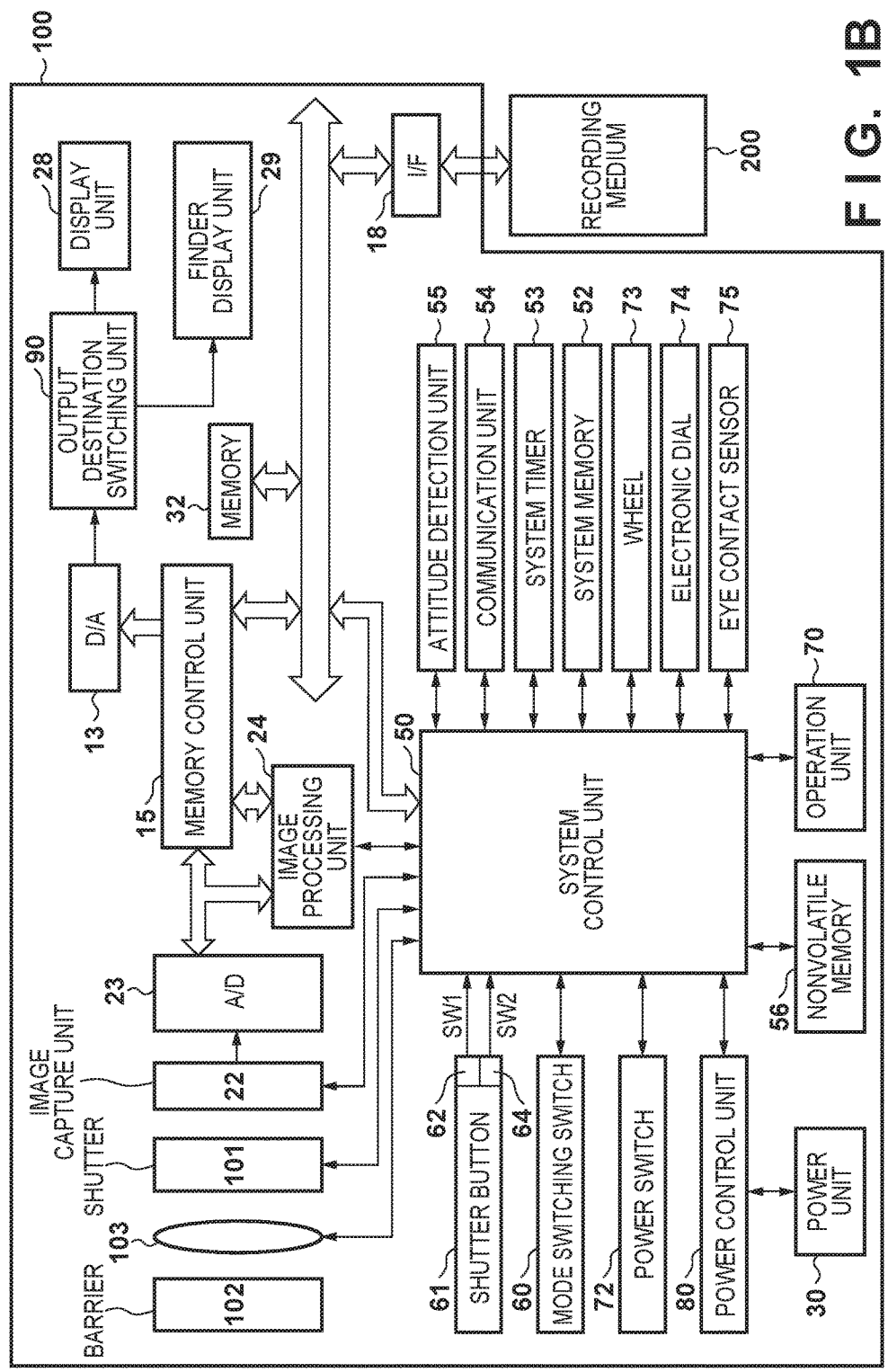
FIG. 1B is a block diagram showing an exemplary functional configuration of a digital camera serving as one example of an image capture apparatus corresponding to an embodiment of the invention.

FIG. 1B is a block diagram showing an exemplary configuration of the digital camera 100 corresponding to an embodiment of the invention. In FIG. 1B, a shooting lens 103 is a lens group including a zoom lens and a focus lens. A shutter 101 is a shutter providing an aperture function. An image capture unit 22 is an image sensor configured with a CCD, a CMOS sensor, or the like that converts an optical image of a subject to an electrical signal. An A/D converter 23 converts analog data output from the image capture unit 22 to digital data. A barrier 102, by covering an image capture system of the digital camera 100, including the shooting lens 103, prevents dirtying or damage of the image capture system including the shooting lens 103, the shutter 101, and the image capture unit 22.

An image processing unit 24 performs predetermined resizing processing such as pixel interpolation or reduction, or color conversion processing, on output data from the A/D converter 23 or output data from a memory control unit 15. Also, with the image processing unit 24, predetermined calculation processing is performed using captured image data, and based on obtained calculation results, a system control unit 50 performs exposure control and distance measurement control. Thus, AF (autofocus) processing, AE (automatic exposure) processing, and EF (pre-flash light emission) processing of a TTL (Through The Lens) scheme are performed. With the image processing unit 24, further, predetermined calculation processing is performed using captured image data, and based on obtained calculation results, AWB (auto white balance) processing of the TTL scheme is also performed.

Output data from the A/D converter 23 is written through the image processing unit 24 and the memory control unit 15, or alternatively, through the memory control unit 15 directly to a memory 32. The memory 32 stores image data that has been obtained by the image capture unit 22 and converted to digital data by the A/D converter 23, or image data for display in the display unit 28. The memory 32 is provided with a storage capacity sufficient to store a predetermined number of still images, or moving images and audio of a predetermined time period.

The memory 32 also includes a memory (video memory) for image display. A D/A converter 13 converts data for image display that is stored in the memory 32 to an analog signal, and supplies this signal to the display unit 28. Thus, image data for display that has been written to the memory 32 can be displayed by the display unit 28 or the finder display unit 29 through the D/A converter 13. The display unit 28 performs display on a display device such as an LCD according to an analog signal from the D/A converter 13. A live-view display can be performed by digital signals that have been once A/D-converted by the A/D converter 23 and accumulated in the memory 32 undergoing analog conversion in the D/A converter 13 to generate image data for display, and being successively transferred and displayed in the display unit 28 or the finder display unit 29. In the present embodiment, this image data for display is also referred to as a live-view image (a through image), for the sake of simplicity.

The eye contact sensor 75 is a proximity sensor (eye contact detection sensor) configured to detect proximity of a body. In the present embodiment, an infrared proximity sensor is used for the eye contact sensor 75. Accordingly, it is possible to detect proximity of a body that reflects projected ultraviolet light, but this is not a limitation, and another sensor may also be adopted as long as it is possible to detect proximity (eye contact) of a user's eye to the finder display unit 29. An output destination switching unit 90 controls an image output destination. When the eye contact sensor 75 has detected proximity of a body (eye contact), the eye contact sensor 75 notifies the system control unit 50 that eye contact is sensed. When the system control unit 50 receives the notification that eye contact is sensed, the system control unit 50 controls the output destination switching unit 90 to switch the output destination of the image data for display to the finder display unit 29. At this time, information to be displayed in the finder display unit 29 is displayed according to a dedicated layout for the finder display unit 29.

When the eye contact sensor 75 no longer detects proximity of a body, that is, when the user has separated their eye from the finder display unit 29, the eye contact sensor 75 notifies the system control unit 50 that eye contact is not sensed. When the system control unit 50 receives the notification that eye contact is not sensed, the system control unit 50 controls the output destination switching unit 90 to switch the output destination of the image data for display to the display unit 28. At this time, information to be displayed in the display unit 28 is displayed according to a dedicated layout for the display unit 28.

A nonvolatile memory 56 is a memory capable of electrically erasing or recording, and for example, an EEPROM or the like is used for the nonvolatile memory 56. Numerical constants, programs, or the like for operation of the system control unit 50 are stored in the nonvolatile memory 56. These programs include a program for executing various flowcharts described later in the present embodiment.

The system control unit 50 controls the overall digital camera 100. By executing a program that has been recorded in the above-described nonvolatile memory 56, each processing of the present embodiment described later is realized. A RAM is used for a system memory 52, and numerical constants, variables, programs read out from the nonvolatile memory 56, and the like for operation of the system control unit 50 are deployed in the system memory 52. Also, the system control unit 50 performs display control by controlling the memory 32, the D/A converter 13, the display unit 28, and the like. A system timer 53 is a clock unit configured to measure time used for various control, or time of a built-in clock. The mode switching switch 60, the shutter button 61, and the operation unit 70 are operation units for input of various operation instructions to the system control unit 50. These correspond to the configurations having the same reference numerals shown in FIG. 1A.

The mode switching switch 60 switches an operation mode of the system control unit 50 to any of a still image recording mode (a still image shooting mode), a movie shooting mode, a playback mode, or the like. Among modes included in the still image recording mode, there are, for example, an auto shooting mode, an auto scene discrimination mode, a manual mode, various scene modes having different shooting settings according to shooting scene, a program AE mode, and a custom mode. The mode switching switch 60 can be used to switch directly to any of these modes, which are included in a menu button. Alternatively, a configuration may be adopted in which after temporarily switching to the menu button with the mode switching switch 60, switching to any of these modes included in the menu button is performed using another operation member. Likewise, a plurality of modes may also be included in the movie shooting mode.

A first shutter switch 62 is switched ON with a so-called half-press (a pre-shooting instruction) during operation of the shutter button 61 provided in the digital camera 100 and thus generates a first shutter switch signal SW1. Operation such as AF (autofocus) processing, AE (automatic exposure) processing, AWB (auto white balance) processing, and EF (pre-flash light emission) processing is started by the first shutter switch signal SW1. A second shutter switch 64 is switched ON with a so-called full-press (shooting instruction) by complete operation of the shutter button 61, and thus generates a second shutter switch signal SW2. With the second shutter switch signal SW2, the system control unit 50 starts operation of one sequence of shooting processing, from reading out a signal from the image capture unit 22 to writing image data to the recording medium 200.

The respective operation members of the operation unit 70, for example by selectively operating various function icons configured to be displayed in the display unit 28, operate as various function buttons, to which appropriate functions for each scene have been assigned. Examples of function buttons include an end button, a return button, an image send button, a jump button, a filter button, an attribute change button, or the like. For example, when a menu button is pressed, a menu screen where various settings can be set is displayed in the display unit 28. A user can intuitively set various settings using the menu screen being displayed in the display unit 28, four direction buttons (up, down, left, right), and a SET button.

The wheel 73 is an operation member capable of rotational operation and is included in the operation unit 70, and is used together with the direction buttons when, for example, instructing a selected item. When the wheel 73 is rotationally operated, an electrical pulse signal is generated according to an operation amount, and the system control unit 50 controls each unit of the digital camera 100 based on this pulse signal. According to this pulse signal, it is possible to determine an angle that the wheel 73 has been rotationally operated, how many times the wheel 73 was rotated, or the like. Note that any configuration may be adopted for the wheel 73, as long as the configuration is an operation member whose rotational operation can be detected. For example, a dial operation member may be adopted in which the wheel 73 itself rotates according to rotational operation by the user, and the dial operation member generates a pulse signal. Also, a configuration may be adopted in which the wheel 73 itself does not rotate, and an operation member composed of a touch sensor detects rotational operation of a user's finger on the wheel 73, or the like (a so-called touch wheel). An electronic dial 74 is a rotating operation member having operational feeling, and is capable of changing settings of various functions that have been assigned.

A power control unit 80 is configured from a battery detection circuit, a DC-DC converter, a switching circuit configured to switch a block where power is applied, and the like, and detects whether or not a battery is installed, a battery type, and a battery remaining amount. The power switch 72 is a push-button for switching power of the digital camera 100 on/off. Also, the power control unit 80 controls the DC-DC converter based on those detection results and instructions of the system control unit 50, and supplies a necessary voltage to each unit, including the recording medium 200, for a necessary time period. A power unit 30 is composed of a primary battery such as an alkali battery or a lithium battery, a secondary battery such as a NiCd battery, a NiMH battery, a Li battery, or the like, and an AC adapter, and the like. A recording medium interface (I/F) 18 is an interface with the recording medium 200, which is a memory card, a hard disk, or the like, and is included in the slot 201. The recording medium 200 is a recording medium such as a memory card for recording a shot image, and is configured from a semiconductor memory, a magnetic disk, or the like.

A communication unit 54 has a wireless or wired connection interface, and sends/receives a video signal or an audio signal to/from an external apparatus. Through the communication unit 54, the digital camera 100 is able to connect to a wireless LAN (Local Area Network) or the Internet. The communication unit 54 is capable of sending an image (including a live-view image) captured with the image capture unit 22, or an image recorded on the recording medium 200, to an external device, and is capable of receiving image data or other various information from an external device.

An attitude detection unit 55 detects the attitude of the digital camera 100 relative to the direction of gravity. Based on the attitude detected by the attitude detection unit 55, it is possible to discriminate whether the digital camera 100 is put in a horizontal orientation or is put in a vertical orientation. It is possible to use an acceleration sensor, a gyro sensor, or the like for the attitude detection unit 55. The method of attitude detection by the attitude detection unit 55 will be described later with reference to FIGS. 2A to 2E.

In a case where the digital camera 100 is put in a horizontal orientation, and image data for display is being displayed in the finder display unit 29 by the output destination switching unit 90, the system control unit 50 sets the display information in the finder display unit 29 to display information for horizontal display. Also, in a case where the digital camera 100 is put in a vertical orientation, and image data for display is being displayed in the finder display unit 29 by the output destination switching unit 90, the system control unit 50 sets the display information in the finder display unit 29 to display information for vertical display. At this time, the display content is switched according to the direction in which the digital camera 100 is tilted. Details of this will be described later with reference to FIGS. 2A to 2E and 3A to 3D.

The digital camera 100 corresponding to the present embodiment is capable of discriminating whether an image that was shot with the image capture unit 22 is an image that was shot with the digital camera 100 put in the horizontal orientation, or an image that was shot with the digital camera 100 put in the vertical orientation. The system control unit 50 is capable of adding orientation information according to the attitude detected by the attitude detection unit 55 to an image file of the image that was shot with the image capture unit 22, rotating the image, and then recording the image.

Attitude of Digital Camera 100

Figure 2A:
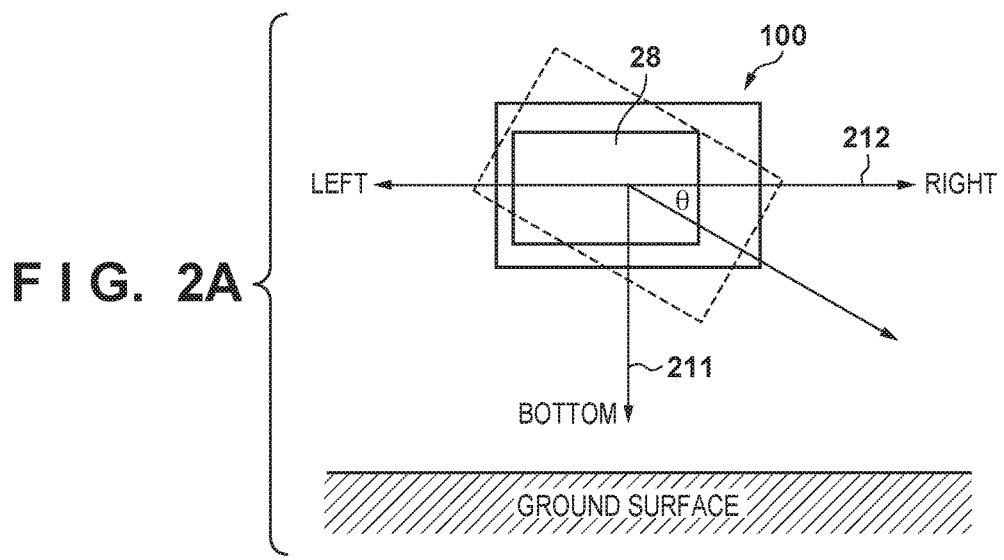
FIGS. 2A to 2E illustrate the attitude of a digital camera corresponding to an embodiment of the invention.

The attitude of the digital camera 100 will be described with reference to FIG. 2A. FIG. 2A illustrates tilting of the digital camera 100. In FIG. 2A, a display plane of the display unit 28 of the digital camera 100 and an imaging plane of the image capture unit 22 are parallel to a plane defined by a vertical direction 211 and a horizontal direction 212, and a bottom face of the digital camera 100 is perpendicular to the vertical direction 211. Also, a lens optical axis is perpendicular to a plane defined by the vertical direction 211 and the horizontal direction 212. It is presumed that the digital camera 100 is held with the bottom face of the digital camera 100 positioned on a ground surface side on that plane, and the top face positioned on an opposite side from the ground surface side, sandwiching the body of the digital camera 100. An outline of the digital camera 100 at this time is shown with a solid line in FIG. 2A. In this case a tilt angle θ is set to 0 degrees.

Here, when the user has lowered a right side (the side where the wheel 73 is disposed) of the digital camera 100 in the vertical direction 211, and raised a left side in the direction opposite to the vertical direction 211, the digital camera 100 has a tilt relative to the horizontal direction 212 with an angle θ. The attitude detection unit 55 detects this angle θ and notifies the system control unit 50 of the detected angle. The angle θ is an angle of the left-right direction of the digital camera 100 (left-right direction of the imaging plane of the image capture unit 22) relative to the horizontal direction 212, and because the horizontal direction 212 is a direction perpendicular to the vertical direction 211 (the direction of gravity), ultimately the angle θ is decided based on the direction of gravity detected by the attitude detection unit 55. Note that even in a case where the imaging plane is not perpendicular to the ground surface, a tilt angle component corresponding to this angle θ is used.

Figure 2B:
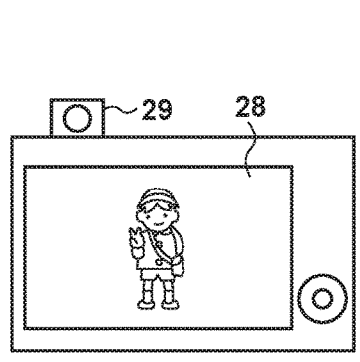
Figure 2C:
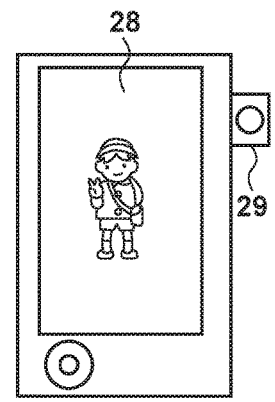
Figure 2D:
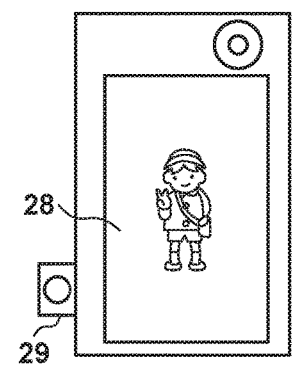
Figure 2E:
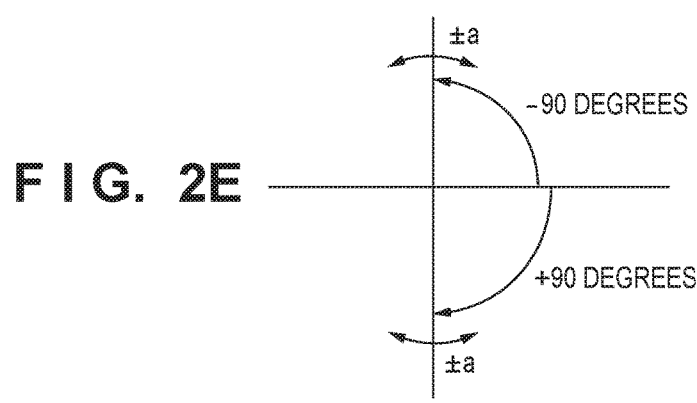

As shown in FIG. 2E, a positive sign is assigned to the angle θ when the digital camera 100 tilts in a clockwise direction (a positive direction), and changes in tilt can be detected. Also, in FIG. 2E, a negative sign is assigned to the angle θ when the digital camera 100 tilts in a counter-clockwise direction (the opposite direction), and changes in tilt can be detected. Note that an inverse assignment of signs to changes in tilt may also be adopted. Here, in a case where the angle θ has a positive sign, and the angle θ is a predetermined angle (for example, 90 degrees), the digital camera 100 can be deemed to be put in a 90 degrees vertical position. On the other hand, in a case where the angle θ has a negative sign, and the angle θ is a predetermined angle (for example, 90 degrees), the digital camera 100 can be deemed to be put in a 270 degrees vertical position. FIGS. 2B, 2C, and 2D respectively show the digital camera 100 in a horizontal position, a 90 degrees vertical position, and a 270 degrees vertical position. The 90 degrees vertical position is an attitude that differs from the horizontal position by 90 degrees, and the 270 degrees vertical position is an attitude that differs from the 90 degrees vertical position by 180 degrees.

Exemplary Display of Finder Display Unit 29

FIGS. 3A to 3D illustrate exemplary arrangements of image capture information when displaying image capture information corresponding to an embodiment of the invention. FIGS. 3A to 3D each show an exemplary display in a case where the aspect ratio was set to 3:2 in shooting settings. That is, the shot image is recorded at 3:2, and the live-view image also is displayed at 3:2. In the display unit 28, because the aspect ratio is the same as the aspect ratio of the live-view image, the live-view image is displayed full-screen, without generating a strip-like area. In the finder display unit 29, because the aspect ratio differs from the aspect ratio of the live-view image, a strip-like area is added, and then the entire live-view image is displayed. More specifically, the live-view image is displayed at a magnification such that the entire length of the live-view image in the horizontal direction matches the length of the finder display unit 29 in the horizontal direction.

Figure 3A:
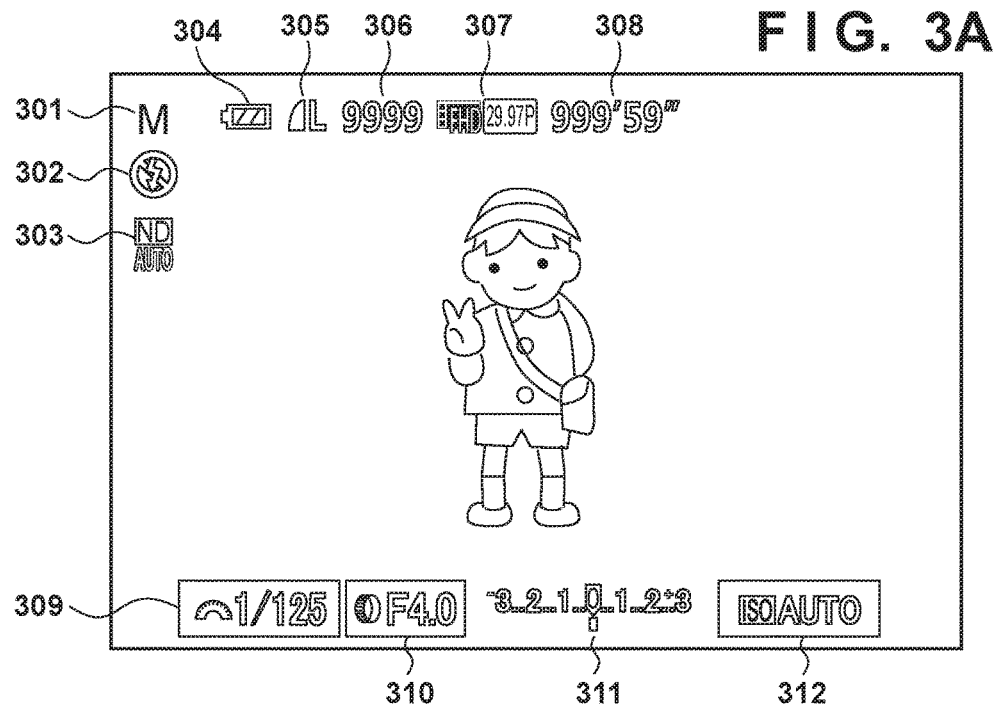

FIG. 3A shows an exemplary arrangement of image capture information displayed in the display unit 28 in a case where the digital camera 100 has been put in the horizontal position, as shown in FIG. 2B. This image capture information (an information group) is displayed superimposed on the live-view image in the display unit 28. The image capture information group of the present embodiment includes, for example, a shooting mode 301, a flash mode 302, an ND filter mode 303, a battery remaining amount display 304, a still image compression ratio 305, a shootable number of still images 306, a movie image quality 307, a shootable movie time 308, a shutter speed 309, an aperture value 310, an exposure level 311, and an ISO sensitivity 312. These items of image capture information are only examples, and other items of image capture information can also be included. In the exemplary display in FIG. 3A, the items of image capture information 301 to 308 are displayed at the upper side of the screen, and the items of image capture information 309 to 312 are displayed at the lower side of the screen.

Figure 3B:
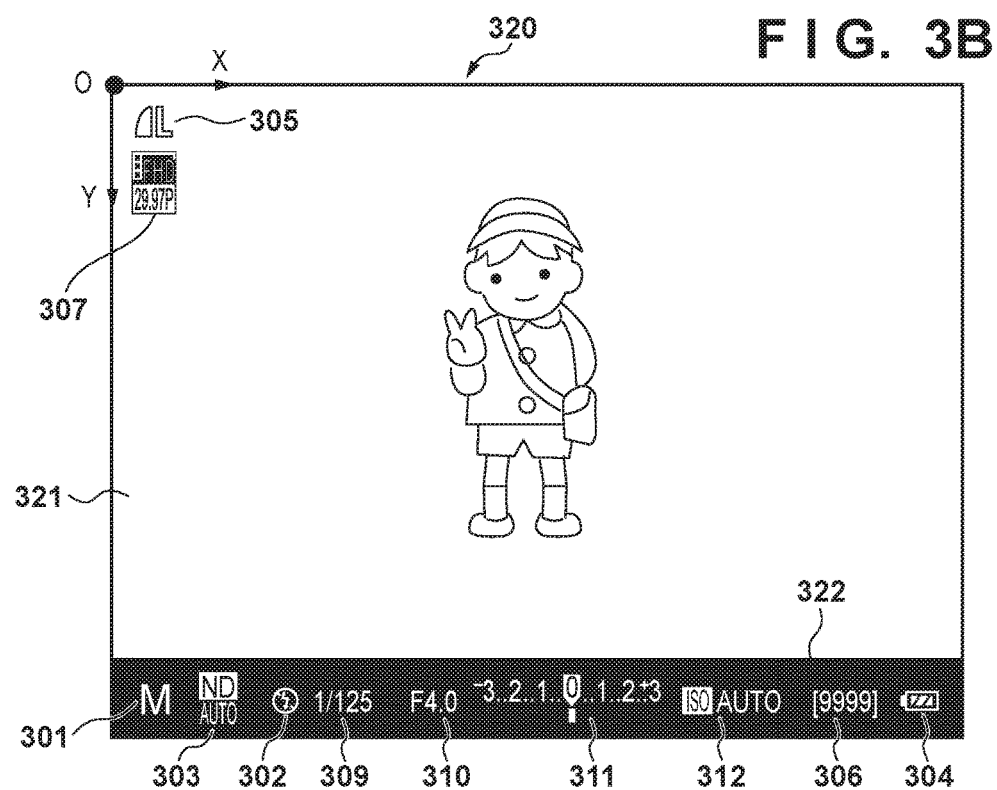

FIGS. 3B to 3D show exemplary displays of image capture information and a live-view image in the finder display unit 29. In FIGS. 3B to 3D, an origin point O in the upper left of the display area of the finder display unit 29, an X direction (horizontal direction), and a Y direction (vertical direction) are respectively shown for convenience in order to indicate that positions viewed from the perspective of a user differ according to attitude, but these are not displayed. A portion of the image capture information is displayed superimposed on the live-view image in the finder display unit 29. FIG. 3B shows an exemplary display of image capture information displayed in the finder display unit 29 in a case where the digital camera 100 has been put in the horizontal position, as shown in FIG. 2B. FIG. 3C shows an exemplary display of image capture information displayed in the finder display unit 29 in a case where the digital camera 100 has been put in the 90 degrees vertical position, as shown in FIG. 2C. FIG. 3D shows an exemplary display of image capture information displayed in the finder display unit 29 in a case where the digital camera 100 has been put in the 270 degrees vertical position, as shown in FIG. 2D.

In FIGS. 3B to 3D, a screen 320 in the finder display unit 29 is divided into an image display area 321 for displaying a live-view image, and a strip-like area 322. The image display area 321 is an area along an entire upper edge (an edge on the top side in the Y axis direction) of the screen 320 in the finder display unit 29 regardless of the attitude of the digital camera 100. In each of FIGS. 3B to 3D, a live-view image is displayed adjacent to the upper edge. The strip-like area 322 is an area along an entire lower edge (an edge on the bottom side in the Y axis direction, opposite to the upper edge) of the screen 320 regardless of the attitude of the digital camera 100. The strip-like area 322 is commonly provided in order to improve the visibility of image capture information, and for example, is displayed so as to have a black background, and in the strip-like area 322 a live-view image of image data obtained by shooting is not displayed. As shown in FIG. 3B, the strip-like area 322 is used as an area for displaying image capture information. A portion of the image capture information that does not fit within the strip-like area 322 is displayed in the image display area 321. In FIG. 3B, items of the image capture information 305 and 307 are displayed in the upper left of the image display area 321. Also, in a case where, as shown in FIGS. 3C and 3D, the digital camera 100 is positioned in the 90 degree vertical position or the 270 degree vertical position, the strip-like area 322 is positioned to the left or right of the screen, so part of the image capture information is displayed in an area at the bottom side of the image display area 321, and the remaining image capture information is displayed in the strip-like area 322. In the examples shown in FIGS. 3C and 3D, the items of image capture information 302, 309, 310, 311, 312, and 306 are displayed at the bottom side of the image display area 321 viewed from the perspective of the user, and the remaining items of image capture information are displayed in the strip-like area 322. However, in the example shown in FIG. 3D, the items of image capture information 305 and 307 are displayed in the upper left of the image display area 321 viewed from the perspective of the user.

Thus, for some of the information among the image capture information to be displayed on the screen, it is possible to decide a position on the screen such that the position appearing to the user substantially does not change even when the position of the digital camera 100 has changed. Specifically, display is performed so as to maintain the positional relationship relative to the edge (the edge on the side of the direction of gravity) that is positioned in the direction of the ground surface in the display area, according to the attitude detected by the attitude detection unit 55. Thus, in any of the cases shown in FIGS. 3B, 3C, and 3D, the items of image capture information 305 and 307 are positioned in the upper left of the screen viewed from the perspective of the user, and the items of image capture information 302, 309, 310, 311, 312, and 306 are positioned at the bottom side of the screen viewed from the perspective of the user. The information whose position appearing to the user is prevented from changing in this way can include, for example, information related to at least any among shutter speed, aperture, exposure, and sensitivity, but other information may also be further included. Such a configuration is adopted in order to allow the user to directly know the settings values of these items of image capture information. Also, in the present embodiment, because the physical position of the strip-like area 322 in the screen is not changed even in a case where the orientation of the digital camera 100 has changed, the image rendering position does not need to be changed. Therefore, problems related to image rendering continuity do not occur, such as a problem that when the manner of holding the digital camera 100 is changed while viewing the live-view image and so the live-view image is rotated, the display position of the live-view image changes during rotation of the live-view image.

Screen Transition Control

Figure 4A:
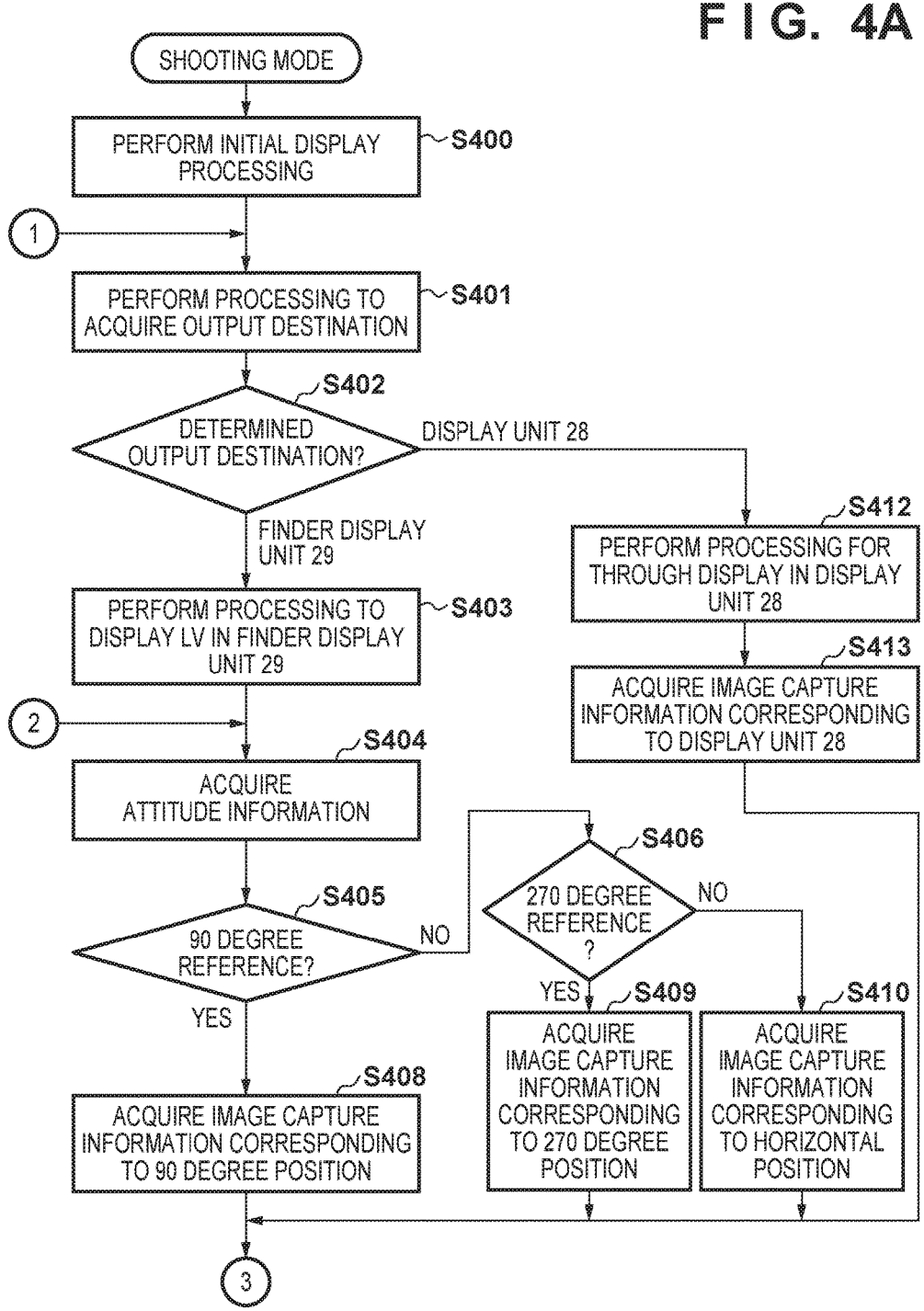
FIGS. 4A and 4B are a flowchart showing an example of shooting mode processing corresponding to an embodiment of the invention.
Figure 4B:
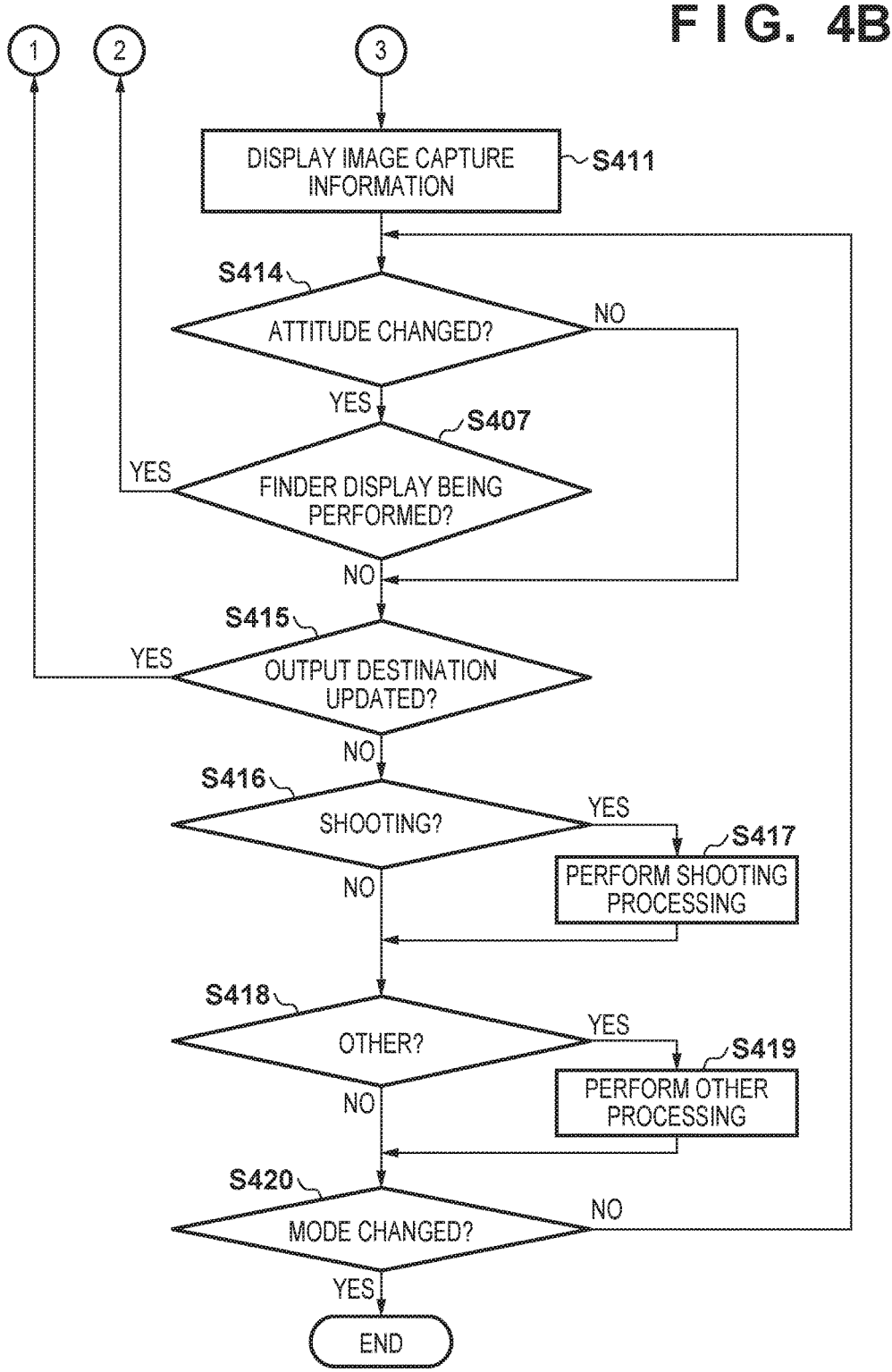

Next, screen transition control of an embodiment of the invention will be described with reference to the flowchart in FIGS. 4A and 4B. The flowchart in FIGS. 4A and 4B show an example of shooting mode processing (for example, processing of the still image recording mode) in the digital camera 100. This processing is realized by the system control unit 50 deploying a program that has been stored in the nonvolatile memory 56 or the like into the system memory 52, and executing that program. When the digital camera 100 is started up and set to the shooting mode, the processing in FIGS. 4A and 4B is started.

The system control unit 50, when starting the still image recording mode, first performs initial display processing in step S400. The initial display processing includes, for example, acquiring various settings values related to shooting from the nonvolatile memory 56 and storing these in the system memory 52, and performing a live-view display (through display) that displays image data from the image capture unit 22. In the live-view (LV) display, without recording the image that is being captured by the image capture unit 22 to the recording medium 200, an approximately real-time moving image is displayed in the display unit 28, and by viewing this real-time moving image, the shooter can check image composition or angle of view, or time shooting.

Next, in step S401, the system control unit 50 acquires an output destination from output destination information that has been stored in the nonvolatile memory 56 or the like, or information acquired from the eye contact sensor 75. Next, in step S402, the system control unit 50 determines the output destination based on the output destination information acquired in step S401. If the output destination is the finder display unit 29, the system control unit 50 moves processing to step S403. On the other hand, if the output destination is the display unit 28, the system control unit 50 moves processing to step S412.

In step S403, the system control unit 50 displays a live-view image of image data displayed in the finder display unit 29. At this time, as shown in FIG. 3B, a presentation is adopted in which the live-view image is displayed in the image display area 321 gathered to one side (the top side in the Y axis direction) in the finder display unit 29, and the strip-like area 322 is left remaining in another side (the bottom side in the Y axis direction). In the present embodiment, the positional relationship of the image display area 321 where the live view image is to be displayed and the strip-like area 322 is fixed and does not change depending on attitude. By adopting such a configuration, as described above, it is possible to maintain continuity of the display position of the live-view image. Also, by arranging the subject image (live-view image) at the top side of the finder display unit 29, and arranging the strip-like area 322 at the bottom side, it is possible to adopt a positional relationship similar to that within an optical finder of a common single-lens-reflex camera. By adopting such an arrangement, even a user who has grown used to an optical finder can use the finder display unit 29, which is an electronic finder, by sight without any discomfort. Note that the live-view image is displayed without rotation regardless of attitude, such that the orientation of the subject image looks correct when viewed from the perspective of the user. After displaying the live-view image, the system control unit 50 moves processing to step S404.

In step S404, the system control unit 50 acquires attitude information from the attitude detection unit 55. Next, in step S405, the system control unit 50 determines, based on the attitude information acquired from the attitude detection unit 55, whether or not the digital camera 100 is in a 90 degree reference attitude (a vertical attitude rotated 90 degrees). When determined that the digital camera 100 is in the 90 degree reference attitude ('YES' in step S405), the system control unit 50 moves processing to step S408. When determined that the digital camera 100 is not in the 90 degree reference attitude ('NO' in step S405), the system control unit 50 moves processing to step S406. The 90 degree reference attitude in this determination corresponds to a case where the tilt of the digital camera 100 was detected as 90 degrees. A configuration may also be adopted in which the angle is not precisely +90 degrees, but is an angle of a certain range including 90 degrees. For example, it is possible to determine a 90 degree reference for an angle of ±α degrees relative to a tilt θ of +90 degrees, as shown in FIG. 2E. The size of α can be arbitrarily set.

Next, in step S406, the system control unit 50 determines, based on the attitude information acquired from the attitude detection unit 55, whether or not the digital camera 100 is in a 270 degree reference attitude (a vertical attitude rotated 270 degrees). When determined that the digital camera 100 is in the 270 degree reference attitude ('YES' in step S406), the system control unit 50 moves processing to step S409. When determined that the digital camera 100 is not in the 270 degree reference attitude ('NO' in step S406), the system control unit 50 moves processing to step S410. The 270 degree reference attitude in this determination corresponds to a case where the tilt of the digital camera 100 was detected as −90 degrees. A configuration may also be adopted in which the angle is not precisely −90 degrees, but is an angle of a certain range including −90 degrees. For example, it is possible to determine a 270 degree reference for an angle of ±α degrees relative to a tilt θ of −90 degrees, as shown in FIG. 2E. Here as well, the size of α can be arbitrarily set.

In step S410, the system control unit 50 acquires image capture information corresponding to a horizontal position that was stored in the nonvolatile memory 56 or the like. The display information is used in order to perform display superimposed on the live-view image being displayed in the finder display unit 29. At this time, the digital camera 100 has a horizontal attitude, so as shown in FIG. 3B, the live-view image is displayed in the image display area 321 on the top side when viewed from the perspective of the user, and the strip-like area 322 is displayed on the bottom side when viewed from the perspective of the user. After data is acquired, processing proceeds to step S411.

In step S408, the system control unit 50 acquires image capture information corresponding to a 90 degree position that was stored in the nonvolatile memory 56 or the like. This display information is used in order to perform display superimposed on the live-view image being displayed in the finder display unit 29. At this time, the digital camera 100 has a 90 degree attitude, so as shown in FIG. 3C, the live-view image is displayed in the image display area 321 on the right side when viewed from the perspective of the user, and the strip-like area 322 is displayed on the left side when viewed from the perspective of the user. Also, the digital camera 100 is positioned in the vertical direction, and icons and the like are also rotated in the vertical direction, such that the image capture information does not become horizontally oriented. Also, each icon is not rotated at the same position, but rather, the icons are arranged with their display position changed, and with the icons moved such that to the extent possible, the same display content is presented as in the case of horizontal display. However, because the aspect ratio of the finder display unit 29 is different, there are icons that cannot fit in the same arrangement as in horizontal display. By arranging these icons in the strip-like area 322, the display data, as much as possible, does not cover the live-view image. After data is acquired, processing proceeds to step S411.

In step S409, the system control unit 50 acquires image capture information corresponding to a 270 degree position that was stored in the nonvolatile memory 56 or the like. This image capture information is used in order to perform display superimposed on the live-view image being displayed in the finder display unit 29. At this time, the digital camera 100 has a 270 degree attitude, so as shown in FIG. 3D, the live-view image is displayed in the image display area 321 on the left side, and the strip-like area 322 is displayed on the right side when viewed from the perspective of the user. Also, the digital camera 100 is positioned in the vertical direction, and icons and the like are also rotated in the vertical direction, such that the image capture information is not horizontally oriented. Also, each icon is not rotated at the same position, but rather, the icons are arranged with their display position changed, and with the icons moved such that to the extent possible, the same display content is presented as in the case of horizontal display. However, because the aspect ratio of the finder display unit 29 is different, there are icons that cannot fit in the same arrangement as in horizontal display. By arranging these icons in the strip-like area 322, the display data, as much as possible, does not cover the live-view image. Therefore, this arrangement is different from the arrangement in the case of the 90 degree reference attitude. After data is acquired, processing proceeds to step S411.

In step S412, the system control unit 50 displays a live-view image in the display unit 28. After displaying the live-view image, in step S413, the system control unit 50 acquires image capture information corresponding to the display unit 28 that was stored in the nonvolatile memory 56 or the like. This image capture information is displayed superimposed on the live-view image being displayed in the display unit 28. An example of display at this time is as shown in FIG. 3A (in a case where the aspect ratio is set to 3:2 in the shooting settings). After data is acquired, processing proceeds to step S411.

In step S411, the image capture information acquired in step S408, S409, S410, or S413 is displayed, in accordance with the display destination, superimposed on the live-view image in the finder display unit 29 or the display unit 28, and then processing proceeds to step S414. In step S414, detection of whether the attitude of the digital camera 100 has changed is performed, and if the attitude has changed ('YES' in step S414), the system control unit 50 moves processing to step S407. On the other hand, if the attitude has not changed ('NO' in step S414), processing proceeds to step S415.

In step S407, the system control unit 50 determines whether or not finder display by the finder display unit 29 is presently being performed. If finder display is presently being performed ('YES' in step S407), processing returns to step S404, and attitude information is acquired. On the other hand, if finder display is not presently being performed ('NO' in step S407), the system control unit 50 moves processing to step S415. In step S415, the system control unit 50 determines whether the output destination was updated, and if the output destination was switched ('YES' in step S415), the system control unit 50 returns to step S401 and repeats processing. On the other hand, if the output destination has not been updated ('NO' in step S415), the system control unit 50 moves processing to step S416. In step S416, the system control unit 50 determines whether a shooting instruction was performed, and if a shooting instruction was performed ('YES' in step S416), in step S417 the system control unit 50 performs shooting processing. In the shooting processing, various parameters for shooting are set to parameters appropriate for the shooting scene, and a shooting operation is performed. On the other hand, if a shooting instruction has not been performed ('NO' in step S416), processing proceeds to step S418.

In step S418, the system control unit 50 determines whether or not another operation was performed. The other operation includes, for example, an operation of an operation unit of the operation unit 70, an operation of the touch panel other than a button icon (for example, such as an operation of another button icon), or the like. With the other operation, it is possible to switch the aspect ratio of an image to be recorded, for example. When the aspect ratio of an image to be recorded is switched, display of the strip-like area of the live-view image is also changed, in accordance with the aspect ratio that has been set. The settable aspect ratios of the image to be recorded include, for example, 1:1, 4:3, 3:2, and 16:9, but the settable aspect ratios are not limited to these. When determined that another operation was performed ('YES' in step S418), processing proceeds to step S419, processing corresponding to that other operation is executed, and then processing proceeds to step S420. When determined that another operation has not been performed ('NO' in step S418), processing proceeds to step S420. In step S420, the system control unit 50 determines whether or not a mode change operation was performed. The mode change operation includes, for example, switching to the movie recording mode, changing to the playback mode, or the like. When determined that a mode change operation was not performed ('NO' in step S420), the system control unit 50 returns to step S414 and repeats processing. On the other hand, when determined that a mode change operation has been performed ('YES' in step S420), the system control unit 50 ends processing of this still image shooting mode.

In the above example, a case where the aspect ratio of the image to be recorded has been set to 3:2 was described, but when the aspect ratio has been set to 16:9, the image becomes wider. Exemplary displays in this case respectively are as follows.

Figure 5A:
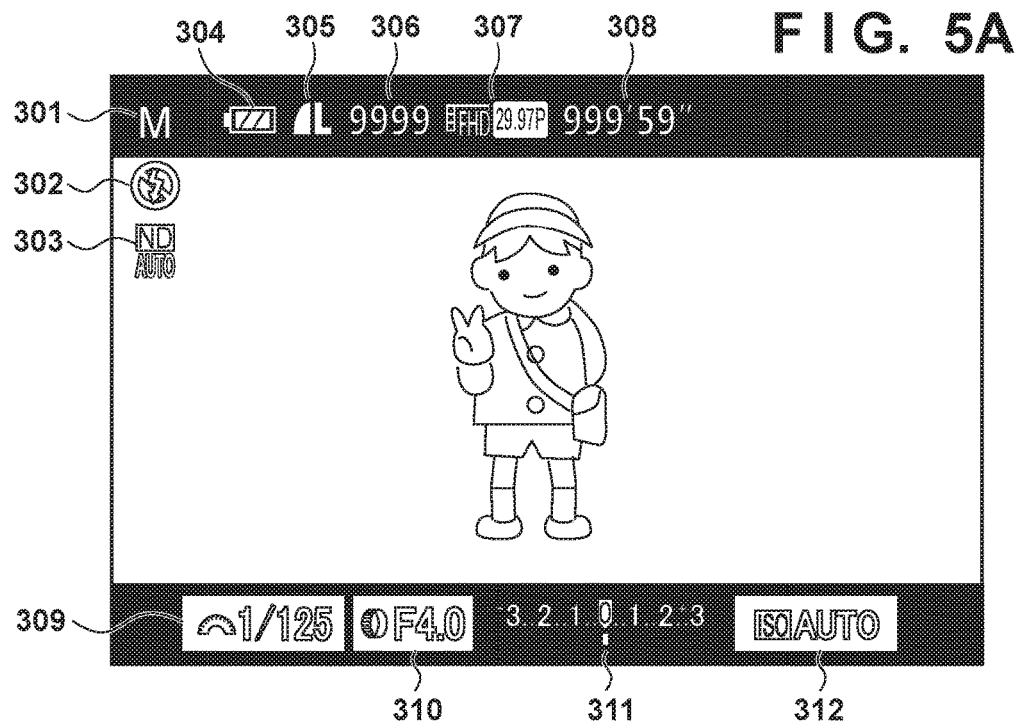

Output destination is the display unit 28 (display through step S413): FIG. 5A

Figure 5B:
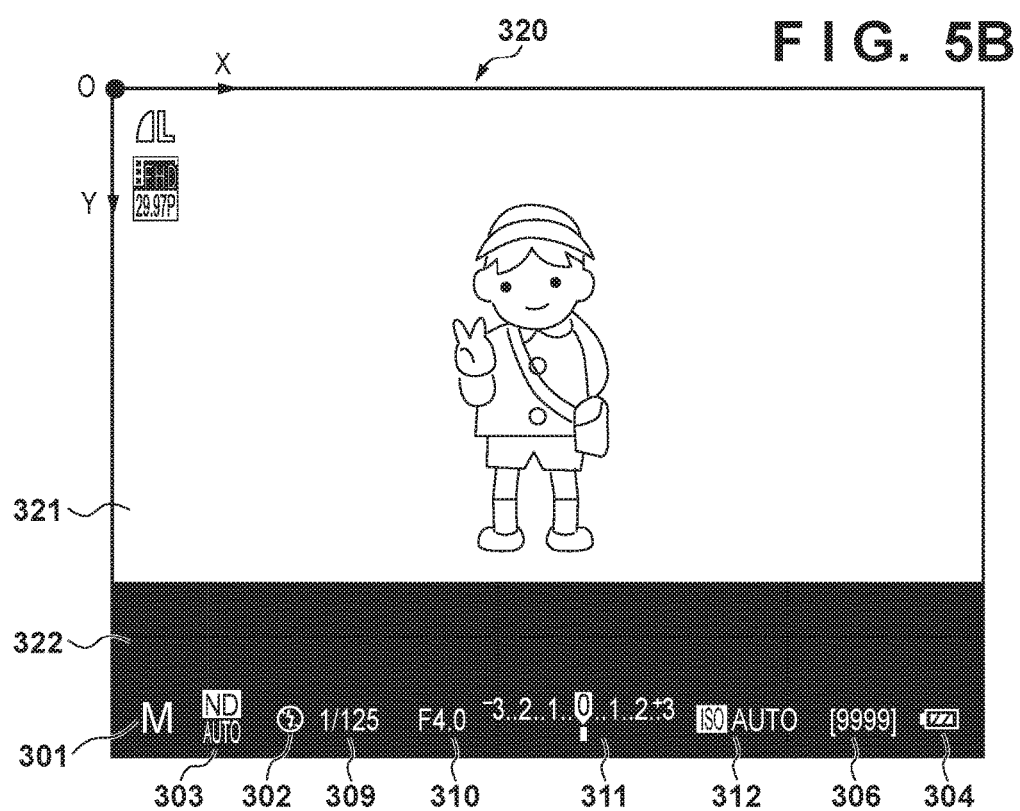

Output destination is the finder display unit 29, with horizontal position ('NO' in step S406): FIG. 5B Output destination is the finder display unit 29, with 90 degrees vertical position ('YES' in step S405): FIG. 5C Output destination is the finder display unit 29, with 270 degrees vertical position ('YES' in step S406): FIG. 5D As shown in FIGS. 5B to 5D, also in a case where the aspect ratio is set to 16:9, a presentation is adopted in which the image display area 321 is gathered to one side (the top side in the Y axis direction) of the display area of the display apparatus of the finder display unit 29, and the strip-like area 322 is left remaining in another side (the bottom side in the Y axis direction). Because the aspect ratio is 16:9, the strip-like area 322 is wider than in a case where the aspect ratio is 3:2. On the other hand, because the 3:2 aspect ratio of the display unit 28 differs from the 16:9 aspect ratio of the image to be recorded, it is necessary to display the strip-like area even when the display destination is the display unit 28. In the display unit 28, unlike the finder display unit 29, strip-like areas (margin areas) are displayed with equal width on both sides (top and bottom in the Y axis direction) of the live-view image (FIG. 5A). That is, the live-view image is displayed with the center of the 16:9 live-view image positioned at the center of the display unit 28, and the margin areas are displayed colored black.

Figure 6A:
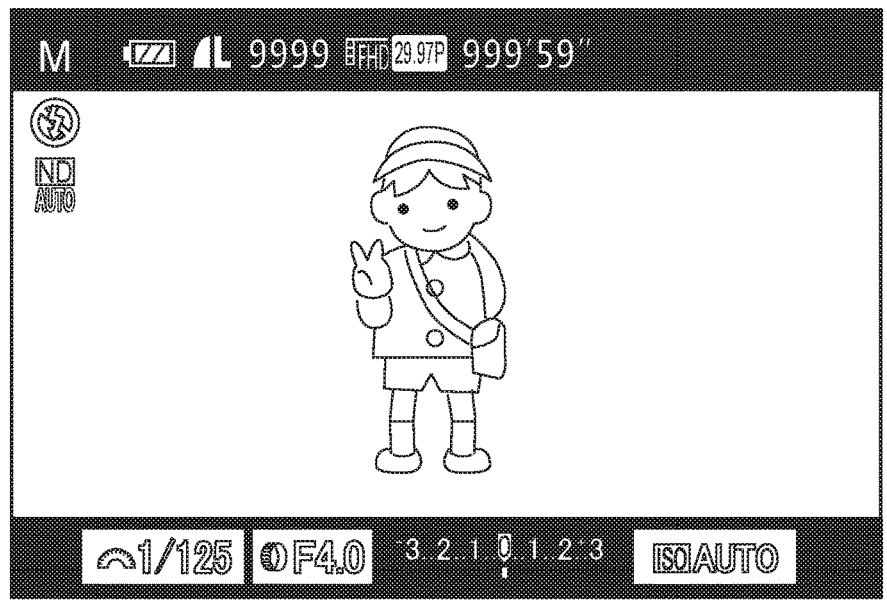
Figure 6B:
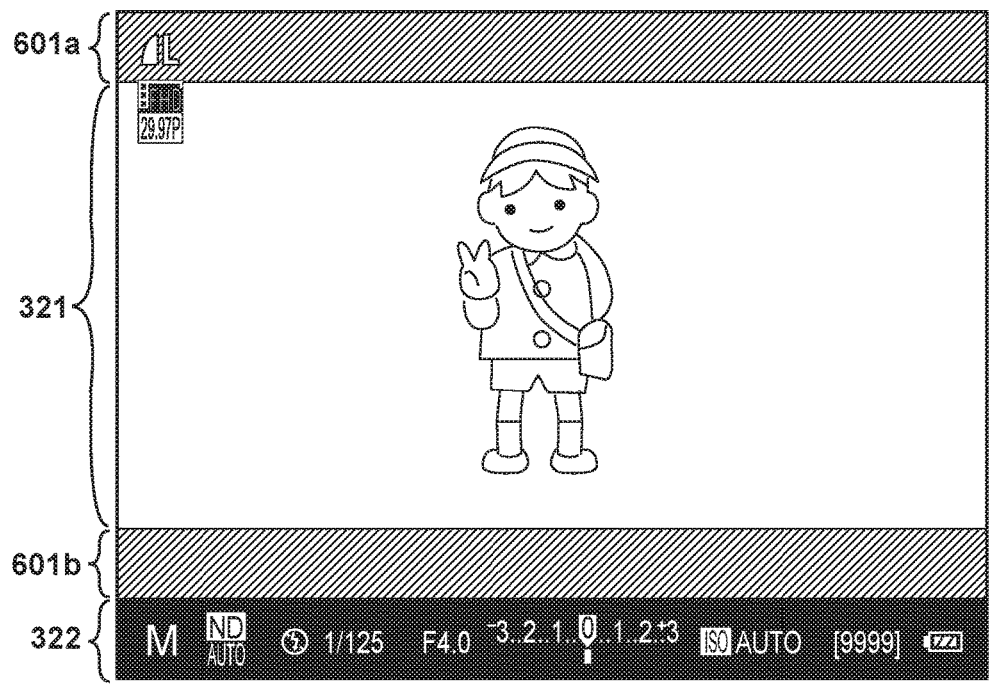

Note that in a case where the aspect ratio of the image to be recorded is not set to 3:2, for example in a case where the aspect ratio is set to 16:9, display in the finder display unit 29 may be performed in a display mode as shown in FIGS. 6B to 6D, rather than a display mode as shown in FIGS. 5B to 5D. Exemplary displays in this case respectively are as follows.

Output destination is the display unit 28 (display through step S413): FIG. 6A (same as FIG. 5A)

Output destination is the finder display unit 29, with horizontal position ('NO' in step S406): FIG. 6B Output destination is the finder display unit 29, with 90 degrees vertical position ('YES' in step S405): FIG. 6C Output destination is the finder display unit 29, with 270 degrees vertical position ('YES' in step S406): FIG. 6D As shown in FIGS. 6B to 6D, in a case where the aspect ratio is set to 16:9, the strip-like area 322 is displayed on one side of the display area of the display apparatus of the finder display unit 29, and the strip-like area 322 has a predetermined width along the lower edge in the Y axis direction. This is the same as in the example described with reference to FIGS. 3B to 3D, and the width of the strip-like area 322 is also the same as in FIGS. 3B to 3D. Also, the image display area 321 is provided in the center of the area other than the strip-like area 322, and remaining margin areas 601a and 601b (provided at both top and bottom sides in the Y axis direction of the image display area 321) are displayed colored black. In the examples shown in FIGS. 6B to 6D, the strip-like area 322 and the margin areas 601a and 601b are shown in different colors in order to distinguish between the strip-like area 322 and the margin areas 601a and 601b, but they may also be displayed so as to be indistinguishable when viewed from the perspective of the user, such as displaying both the strip-like area 322 and the margin areas 601a and 601b colored black. By adopting such a configuration, the image capture information display can be displayed with good visibility in the strip-like area 322 along the lower edge in the Y axis direction of the display area of the display apparatus of the finder display unit 29 regardless of attitude. Also, in the exemplary displays having a 16:9 aspect ratio in FIGS. 5B to 5D, the center of the display area 322 of the live-view image differs from the exemplary displays having a 3:2 aspect ratio in FIGS. 3B to 3D. Accordingly, when changing the aspect ratio setting, the rendering position of the live-view image changes, and therefore the user is possibly made to feel discomfort. On the other hand, if display is performed as shown in FIGS. 6B to 6D, the center of the display area 322 of the live-view image is the same as in the exemplary displays having a 3:2 aspect ratio in FIGS. 3B to 3D. Accordingly, the user is not made to feel a shift in display position of the live-view image accompanying switching of the aspect ratio setting.

As described above, with the digital camera 100, which is an image capture apparatus corresponding to the present embodiment, it is possible to control display in the finder display unit 29 according to attitude of the apparatus. Specifically, the position of the image display area 321 in the finder display unit 29 can be decided in a fixed manner within the screen. Thus, the position of the image display area 321 in the finder display unit 29 does not change even when the attitude of the digital camera 100 changes, so it is not necessary to change the rendering position of the live-view image according to attitude.

On the other hand, regarding the display position of the image capture information supplied to the user in the finder display unit 29, the position in the screen can be changed according to the attitude of the digital camera 100. When doing so, the position of the image capture information within the screen is decided such that the position where specific image capture information appears substantially does not change, in relationship to the perspective of the user. The specific image capture information can include, for example, information related to at least any among shutter speed, aperture, exposure, and sensitivity. Also, information other than the specific image capture information can be displayed using the strip-like area 322. Thus, it is possible to perform shooting with high visibility of image capture information at the same time as securing a large area for displaying the live-view image in the image capture apparatus.

The above-described control of the system control unit 50 may be performed by a single hardware unit, or control of the overall apparatus may be performed by a plurality of hardware units distributing processing. Also, embodiments of the present invention were described in detail, but the present invention is not limited to these specific embodiments, and various modes in a scope not departing from the gist of the invention are also encompassed by the present invention. Furthermore, each embodiment described above merely expresses one embodiment of the present invention, and embodiments can also be combined as appropriate.

Also, in the above-described embodiments, an exemplary case is described where the present invention is applied to the digital camera 100, but this is not a limitation; the invention is applicable to any image capture apparatus having a display unit and capable of attitude detection. That is, the present invention is applicable to a personal computer or PDA having a camera, a mobile telephone terminal or mobile image viewer having a camera, a game device having a camera, an electronic book reader having a camera, or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201541 filed on Oct. 9, 2015, which is hereby incorporated by reference herein in its entirety.

What is claimed is:

1. An image capture apparatus, comprising:
an image capture unit;
an attitude detector which detects an attitude of the image capture apparatus; and
a memory and at least one processor which function as:
a display control unit which performs control so as to display an image that was captured by the image capture unit in, among a first area along a first edge of a display unit visible through an eyepiece unit of an eyepiece finder, and a second area differing from the first area and along a second edge opposing the first edge of the display unit, the first area regardless of the attitude detected by the attitude detector, and so as to display an information group related to shooting on the display unit with an arrangement that differs according to the attitude detected by the attitude detector,
the image capture apparatus further comprising:
a second display unit visible from outside different from the eyepiece finder; and
an eye contact detector which detects eye contact to the eyepiece finder,
wherein the display control unit performs control such that in the second display unit, display is performed such that the center of the image that was captured by the image capture unit is positioned at the center of the second display unit, and margin areas of equal width are displayed on both sides of the displayed image, and
the display control unit performs control so as to display the image and the information group in the display unit within the eyepiece finder in a case where eye contact was detected by the eye contact detector, and so as to display the image and the information group in the second display unit in a case where eye contact has not been detected by the eye contact detector.

2. The image capture apparatus according to claim 1, wherein the first edge is an upper edge, and the second edge is a lower edge.

3. The image capture apparatus according to claim 1, wherein among a first attitude, a second attitude differing by 90 degrees from the first attitude, and a third attitude differing by 180 degrees from the second attitude, in the case of the attitude detected by the attitude detector is the first attitude, the display control unit performs control so as to display at least a portion of the information group in the second area, without superimposing display on the first area.

4. The image capture apparatus according to claim 1, wherein display is performed so as to maintain a relative positional relationship of at least part of the information group relative to an edge on a side in the direction of gravity in the display unit, based on the attitude detected by the attitude detector.

5. The image capture apparatus according to claim 1, wherein the first area is an area along the entire first edge, and the second area is an area along the entire second edge.

6. The image capture apparatus according to claim 1, wherein the display control unit performs control so as to display the image that was captured by the image capture unit adjacent to the first edge.

7. The image capture apparatus according to claim 6, wherein the display control unit performs control so as to display the image that was captured by the image capture unit adjacent to the first edge in a case where the image that was captured by the image capture unit has a first aspect ratio, or in a case where the image that was captured by the image capture unit has a second aspect ratio.

8. The image capture apparatus according to claim 6, wherein the display control unit performs control so as to display the image that was captured by the image capture unit adjacent to the first edge in a case where the image that was captured by the image capture unit has a first aspect ratio, and perform display such that the center of the image that was captured by the image capture unit is positioned at the center of the first area in a case where the image that was captured by the image capture unit has a second aspect ratio, and display a margin area on both sides of the displayed image in the first area.

9. The image capture apparatus according to claim 1, wherein the information group includes at least one item of information among shutter speed, aperture, exposure, and sensitivity.

10. The image capture apparatus according to claim 1, wherein the image is a live-view image.

11. A method of controlling an image capture apparatus having an image capture unit, comprising:
   detecting an attitude of the image capture apparatus;
   displaying an image that was captured by the image capture unit in, among a first area along a first edge of a display unit visible through an eyepiece unit of an eyepiece finder, and a second area differing from the first area and along a second edge opposing the first edge of the display unit, the first area regardless of the detected attitude;
   displaying an information group related to shooting on the display unit with an arrangement that differs according to the detected attitude;
   controlling a second display unit visible from outside different from the eyepiece finder such that the center of the image that was captured by the image capture unit is positioned at the center of the second display unit, and margin areas of equal width are displayed on both sides of the displayed image; and
   displaying the image and the information group on the display unit within the eyepiece finder in a case where eye contact was detected by an eye contact detector which detects eye contact to the eyepiece finder, and so as to display the image and the information group on the second display unit in a case where eye contact has not been detected by the eye contact detector.

12. A non-transitory computer-readable storage medium storing a computer program which causes an image capture apparatus comprising an image capture unit, an attitude detector which detects an attitude of the image capture apparatus, and an eye contact detector which detects eye contact to an eyepiece finder to perform operations of:
   displaying an image that was captured by the image capture unit in, among a first area along a first edge of a display unit visible through an eyepiece unit of the eyepiece finder, and a second area differing from the first area and along a second edge opposing the first edge of the display unit, the first area regardless of the attitude detected by the attitude detector;
   displaying an information group related to shooting on the display unit with an arrangement that differs according to the attitude detected by the attitude detector,
   controlling a second display unit visible from outside different from the eyepiece finder, such that the center of the image that was captured by the image capture unit is positioned at the center of the second display unit, and margin areas of equal width are displayed on both sides of the displayed image; and
   displaying the image and the information group on the display unit within the eyepiece finder in a case where eye contact was detected by the eye contact detector, and so as to display the image and the information group on the second display unit in a case where eye contact has not been detected by the eye contact detector.

* * * * *